(12) United States Patent
Yao et al.

(10) Patent No.: US 11,068,276 B2
(45) Date of Patent: *Jul. 20, 2021

(54) CONTROLLED CUSTOMIZATION OF SILICON INITIALIZATION

(71) Applicant: Intel Corporation, Santa Clara, CA (US)

(72) Inventors: Jiewen Yao, Shanghai (CN); Vincent Zimmer, federal way, WA (US); Nicholas Adams, Beaverton, OR (US); Willard Wiseman, Tigard, OR (US); Giri Mudusuru, Portland, OR (US); Nuo Zhang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/431,444

(22) Filed: Jun. 4, 2019

(65) Prior Publication Data

US 2019/0286450 A1    Sep. 19, 2019

Related U.S. Application Data

(63) Continuation of application No. 15/100,267, filed as application No. PCT/CN2013/090695 on Dec. 27, 2013, now Pat. No. 10,310,865.

(51) Int. Cl.
*G06F 9/00* (2006.01)
*G06F 15/177* (2006.01)
(Continued)

(52) U.S. Cl.
CPC .......... *G06F 9/4403* (2013.01); *G06F 9/4411* (2013.01); *G06F 9/44505* (2013.01);
(Continued)

(58) Field of Classification Search
CPC .... G06F 9/4401; G06F 9/4403; G06F 9/4411; G06F 9/44505; G06F 21/572; G06F 21/575
See application file for complete search history.

(56) References Cited

PUBLICATIONS

Chinese Office Action received in Chinese Patent Application 201380081275, dated Jan. 15, 2020, with English ranslation.
(Continued)

*Primary Examiner* — Nitin C Patel
(74) *Attorney, Agent, or Firm* — Alliance IP, LLC

(57) ABSTRACT

The present disclosure is directed to controlled customization of silicon initialization. A device may comprise, for example, a boot module including a memory on which boot code is stored, the boot code including at least an initial boot block (IBB) module that is not customizable and a global platform database (GPD) module including customizable data. The IBB module may include a pointer indicating GPD module location. The customizable data may comprise configurable parameters and simple configuration language (SCL) to cause the device to execute at least one logical operation during execution of the boot code. The GPD module may further comprise a pointer indicating SCL location. The boot code may be executed upon activation of the device, which may cause the IBB module to load an interpreter for executing the SCL. The interpreter may also verify access request operations in the SCL are valid before executing the access request operations.

21 Claims, 6 Drawing Sheets

(51) Int. Cl.
*G06F 9/4401* (2018.01)
*G06F 9/445* (2018.01)
*G06F 21/57* (2013.01)

(52) U.S. Cl.
CPC .......... *G06F 21/572* (2013.01); *G06F 21/575* (2013.01); *G06F 9/4401* (2013.01)

(56) References Cited

PUBLICATIONS

European Office Action received in European Patent Application 13 900 327.1, dated Jul. 18, 2019, 6 pages.
Chinese Office Action received in Chinese Patent Application 201380081275, dated Jun. 25, 2019.

CONTROLLED CUSTOMIZATION OF SILICON INITIALIZATION

CROSS REFERENCE TO RELATED APPLICATIONS

This application is a Continuation of U.S. patent application Ser. No. 15/100,267 filed May 27, 2016 issued on Jun. 4, 2019 as U.S. Pat. No. 10,310,865 which is a National Stage Entry of PCT Application PCT/CN2013/090695 filed Dec. 27, 2013, the contents of both of which are referenced herein in their entirety.

TECHNICAL FIELD

The present disclosure relates to device boot operations, and more particularly, to a bootstrap code that may be substantially secure while providing some configurable aspects.

BACKGROUND

Silicon initialization may include various operations to be performed upon activation of a device prior to loading an operating system (OS). Examples of these operations may include, but are not limited to, obtaining information about equipment included in the device, loading drivers for the equipment, establishing interfaces for facilitating interaction between the equipment and software to be loaded in the device (e.g., the OS), etc. At least part of the silicon initialization may pertain to individual components and/or chipsets (e.g., a processor, coprocessor, support components such as bus controllers, memory, memory controllers, etc.) that may be employed in the device, and thus, may be identical for every device utilizing the individual components and/or chipsets. When implemented in similarly configured devices, there is no reason for a user of the equipment (e.g., device developer, device manufacturer, device seller, device repair facility, etc.) to alter this portion of the silicon initialization.

However, the continual expansion of computing functionality to a wide array of new applications is requiring some level of customization. For example, equipment may be used in a variety of devices (e.g., stationary computing devices, mobile computing devices, mobile communication devices, etc.). Utilization of the same equipment may be advantageous from an economy of scale, but may also require tweaking to make the equipment function correctly in different operational environments. Historically, silicon initialization operations would be developed jointly between the equipment manufacturer and device manufacture. However, such collaboration is resource intensive and may result custom silicon initialization code that cannot be universally applied. Another approach is to give device developers access to boot code so that they can develop custom silicon initialization operations based on the particular device. An issue with giving the device developers full access to designing their own silicon initialization is that the industry standards may not be maintained, guidelines provided by the equipment manufacturer may not be followed, etc. Thus, there is no way to ensure that the equipment will operate in the manner intended, will remain stable, will remain secure, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
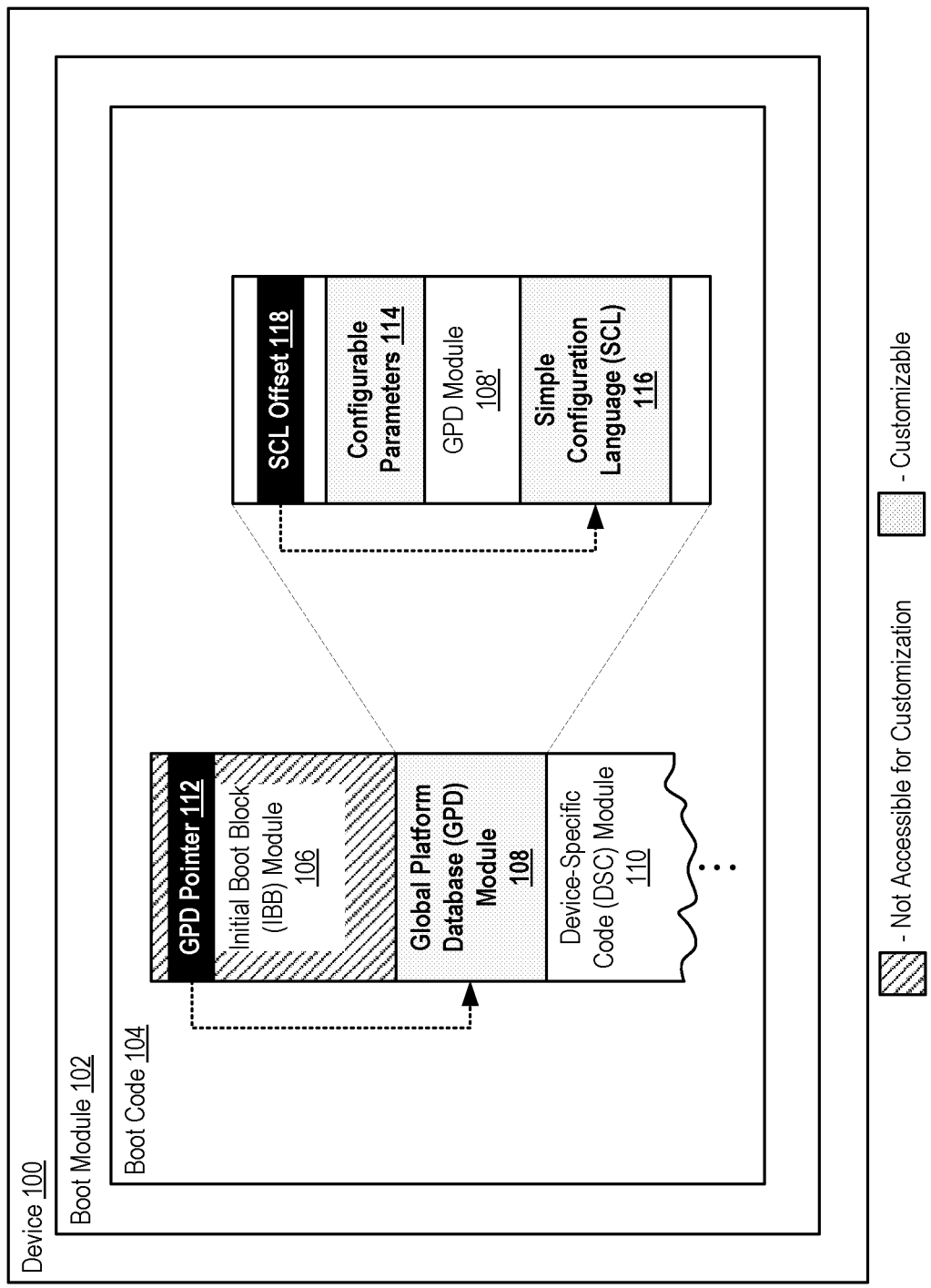
FIG. 1 illustrates an example device including controlled customization of silicon initialization in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to controlled customization of silicon initialization. A device may comprise, for example, a boot module including a memory on which boot code is stored. Example boot code may include an initial boot block (IBB) module that is not accessible for customization and a global platform database (GPD) module including customizable data. An example IBB module may include at least a pointer indicating the location of the GPD module in the boot code. Customizable data may include, for example, configurable parameters and simple configuration language (SCL) to cause the device to execute at least one logical operation during execution of the boot code. The GPD module may further comprise an offset indicating the location of the SCL in the GPD module. The boot code may be executed upon activation of the device, which may cause the IBB module to load an interpreter for executing the SCL. In one embodiment, the interpreter may verify access request operations in the SCL are valid before executing the access request operations.

In one embodiment, a device configured for controlled customization of silicon initialization may comprise at least a boot module. The boot module may include at least a memory on which boot code is stored. The boot code may be executed when the device is activated and may include at least an initial boot block module that is not accessible for customization and a global platform database module including at least customizable data.

The initial boot block may comprise, for example, a pointer indicating where in the boot code the global platform database module is located. In one embodiment, the pointer may be an entry included in a firmware information table in the initial boot block. The initial boot block may be at least to determine if an update to a current global platform database module exists in the device. If it is determined by the initial boot block that an update to the current global platform database module exists, the initial boot block may further be to load an updated global platform database module into the boot code, mark the current global platform database module as invalid and update the pointer in the initial boot block to indicate where in the boot code the updated global platform database module is located.

In one embodiment, the customizable data may comprise at least one configurable parameter. The customizable data may also comprise at least simple configuration language to cause the device to execute at least one operation during execution of the boot code. For example, the global platform database module may comprise an offset indicating where in the global platform database module the simple configuration language is located. The initial boot block may be at least to cause an interpreter to be loaded during execution of the boot code, the interpreter being at least to execute the simple configuration language. In the same or a different embodiment, the interpreter may further be to determine if at least one access request operation included in the simple configuration language is valid prior to executing the at least one access request operation. An example method for controlled customization of silicon initialization consistent with the present disclosure may comprise initiating an initial boot block module included in boot code in a device, the boot block not being accessible for customization, locating a pointer in the initial boot block to a global platform database module also included in the boot code, the global platform database module including at least customizable data, determining if the pointer to the global platform database module is valid and utilizing the global platform database module as part of the boot code based on a determination that the pointer is valid.

FIG. 1 illustrates an example device including controlled customization of silicon initialization in accordance with at least one embodiment of the present disclosure. The following disclosure may utilize terminology such as "bootstrap," or "boot" to reference resources (e.g., hardware, software, etc.) that may be active (e.g., executing boot operations) after a device is activated. Boot operations may launch various drivers, a kernel, etc. to provide an interface over which hardware and software (e.g., an OS) may interact. Known specifications for boot code may comprise Basic Input/Output System (BIOS), Unified Extensible Firmware Interface (UEFI), etc. While examples presented herein may utilize terminology, elements, systems, etc. commonly associated with a particular specification, these references have been made merely for the purpose of explanation. Embodiments consistent with the present disclosure are not limited to implementation using only BIOS or UEFI, and may employ coding based on other boot specifications.

Device 100, as disclosed in FIG. 1, may be any processor-driven device. Examples of device 100 may comprise, but are not limited to, a mobile communication device such as a cellular handset or a smartphone based on the Android® OS, iOS®, Windows® OS, Mac® OS, Tizen® OS, Firefox® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a server, a smart television, a small form factor computer (e.g., for space-limited applications, television-top boxes, etc.) like the Next Unit of Computing (NUC) platform from the Intel Corporation, etc. Device 100 may comprise at least boot module 102, which includes hardware such as a memory in which boot code 104 may be stored. Example memory may be nonvolatile (NV) storage that may be truly read-only or field updateable. Boot code 104 may include compiled program code including operations that execute when device 100 is activated (e.g., due to device 100 powering up, from a command to reboot device 100, etc.). In general, boot operations may configure device 100 so that equipment in device 100 may be able to interact with an OS. Example equipment may include at least any hardware incorporated within, or at least coupled to, device 100. An example of an OS may include any software-based control system for managing operations in device 100. In one embodiment, prior to boot code 104 taking control over boot operations for device 100, boot code 104 may be cryptographically verified to ensure that it is the original version provided by a silicon equipment manufacturer (e.g., that boot code 104 is authentic, unaltered, etc.).

In one embodiment, boot code 104 may comprise IBB module 106, GPD module 108 and device-specific code (DSC) module 110. IBB module 106 may comprise code for silicon initialization in device 100 that is not accessible for configuration. For example, IBB module 106 may be formulated as silicon integrated code (SIC) and then supplied by a manufacturer of silicon equipment (e.g., individual integrated circuits (ICs), chipsets, etc.) for use in device 100. IBB module 106 may be substantially the same (e.g., may not need to be customized) for any similarly configured device 100 utilizing the silicon equipment for which the SIC was formulated. As a result, there should be no need for an end user (e.g., device designer, device manufacturer, repair facility, etc.) to customize IBB module 106 when the configuration of devices 100 are similar.

In one embodiment, since the memory (e.g., a read-writable NV memory) where GPD module 108 is stored and the UEFI Variable layout may vary per manufacturer, GPD module 108 may also include declarative encoding of the type of NV memory (e.g., manufacturer) or variable (e.g., GUID that matches what is on edk2.sourceforge.net for the latter). Alternately, SCL 116 may comprise operations to abstract low-level NV memory writes and higher-level UEFI variable interpretation, respectively.

However, it may also be possible to employ certain silicon equipment in differently configured devices 100. For example, devices intended for different uses (e.g., stationary computing device, mobile computing device, mobile communication device, etc.) may use different types of equipment in a variety of configurations. To perform silicon initialization, IBB module 106 may require some knowledge of the configuration of device 100. However, generating device-specific boot code 104 for from the ground up is very resource intensive (e.g., may require collaboration between engineers from the silicon equipment provider, the end user, etc.). Providing access to customize IBB module 106 may also be problematic in that the end user may be allowed to modify boot code 104 in a manner that does not comply with standards, does not conform to guidelines set by the silicon equipment manufacturer, and may result in unintended or unstable operation of the silicon equipment, or thus, device malfunction or even failure.

Consistent with the present disclosure, GPD module 108 may include configurable data that an end user may employ to configure silicon initialization in device 100 without substantially altering IBB module 106. In one embodiment, IBB module 106 may comprise at least GPD pointer 112 to indicate where in boot code 104 GPD module 108 is situated. For example, GPD pointer 112 may indicate where data comprised in GPD module 108 initiates in boot code 104. GPD pointer 112 may cause IBB module 106 to access to GPD module 108 to customize silicon initialization for device 100. An embodiment of GPD module 108 is disclosed in greater detail in FIG. 1 in regard to GPD module 108'. GPD module 108' may comprise, for example, configurable parameters 114, SCL 116 and an SCL Offset 118. Configurable parameters 114 may comprise, for example, bit settings, integers, strings and/or other data types that describe configuration characteristics of device 100 such as, but not limited to, motherboard configuration, memory configuration, Input/Output (I/O) configuration, wired and/or wireless communication interface configuration, user interface configuration, etc. Accessing GPD module 108' may further cause IBB module 106 to execute SCL 116 (e.g., as directed by SCL Offset 118). SCL 116 may comprise at least one instruction that, upon execution, causes at least one logical operation to be performed during the execution of boot code 104. In one embodiment, during the execution of boot code 104 IBB module 106 may cause an interpreter to be loaded in device 100 to execute the at least one instruction in SCL 116. End users may employ SCL 116 to insert various functionality into the execution of boot code 104. Example functionality that may be performed via SCL 116 may include accessing certain information stored in device 100, causing certain drivers, utilities, applications, etc. to be launched during the execution of boot code 104, etc.

The benefit of being able to insert functionality into silicon initialization, as provided by SCL 116, may also introduce a potential vulnerability to device 100. For example, it may be possible for an attacker (e.g., malware such as virus or rootkit, etc.) to modify SCL 116 to gain control over device 100. In one embodiment, the interpreter loaded by IBB module 106 may also be configured to validate any access request operations included in SCL 116 prior to executing the access request operation. Validation may include, for example, determining if the access request operation has been associated with a known type of attack, determining if allowing the requested access could be potentially harmful to device 100, etc. If the access request operation is validated, then access may be granted to the resource. If validation fails, then execution of SCL 116 may proceed while disallowing the access request operation. The completion of silicon initialization (e.g., the execution of IBB module 106) may then be followed by execution of DCS module 110 wherein the end user may configure other drivers, interfaces, etc. for loading prior to the initialization of an OS for controlling the operation of device 110.

Figure 2:
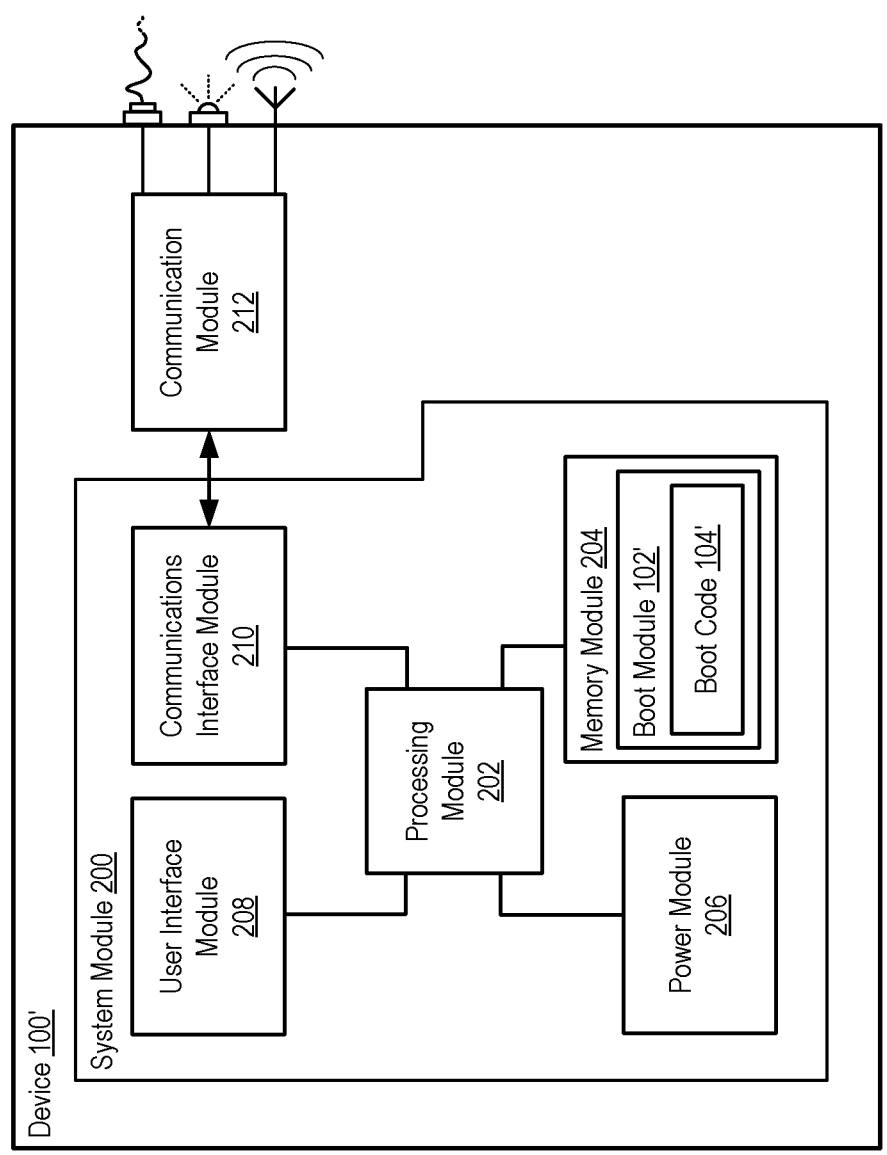
FIG. 2 illustrates an example configuration for a device in accordance with at least one embodiment of the present disclosure.

FIG. 2 illustrates an example configuration for a device in accordance with at least one embodiment of the present disclosure. In particular, device 100' may be able to perform example functionality such as disclosed in FIG. 1. However, device 100' is meant only as an example of equipment usable in embodiments consistent with the present disclosure, and is not meant to limit these various embodiments to any particular manner of implementation.

Device 100' may comprise, for example, system module 200 configured to manage device operations. System module 200 may include, for example, processing module 202, memory module 204, power module 206, user interface module 208 and communication interface module 210. Device 100' may also include communication module 212 that may interact with communication interface module 210. While communication module 212 has been shown separately from system module 200, the example implementation of device 100' has been provided merely for the sake of explanation herein. Some or all of the functionality associated with communication module 212 may also be incorporated in system module 200.

In device 100', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., such as in the Sandy Bridge family of processors available from the Intel Corporation). In one embodiment, individual ICs and/or chipsets included in processing module 202 may be deemed silicon equipment as previously described herein.

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of device 100' such as, for example, static RAM (SRAM) or Dynamic RAM (DRAM). ROM may comprise, for example, boot module 102' including NV memory configured with boot code 104' (e.g., based on BIOS, UEFI, etc.) for causing device 100' to perform various operations upon activation, programmable memories such as electronic programmable ROMs (EPROMS), Flash, etc. Other fixed and/or removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), digital video disc (DVD), etc.

Power module 206 may include internal power sources (e.g., a battery) and/or external power sources (e.g., electromechanical or solar generator, power grid, fuel cell, etc.), and related circuitry configured to supply device 100' with the power needed to operate. User interface module 208 may include equipment and/or software to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within device 100' and/or may be coupled to device 100' via a wired or wireless communication medium.

Communication interface module 210 may be configured to manage packet routing and other control functions for communication module 212, which may include resources configured to support wired and/or wireless communications. In some instances, device 100' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communication via sound wave transmission, etc. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

Figure 3:
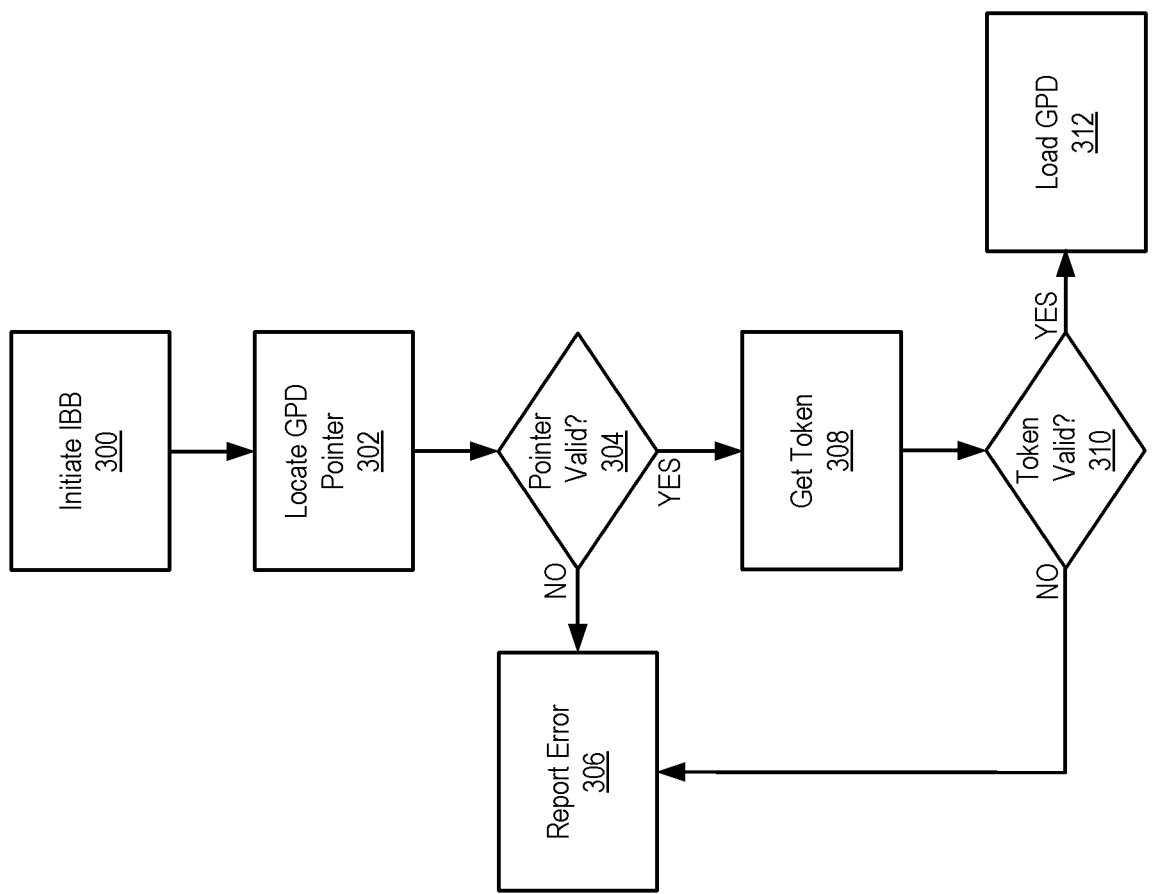
FIG. 3 illustrates example operations for silicon initialization in accordance with at least one embodiment of the present disclosure.

FIG. 3 illustrates example operations for silicon initialization in accordance with at least one embodiment of the present disclosure. In general, the operations disclosed in FIG. 3 describe what may occur subsequent to the activation of device 100 (e.g., from a hard power down, soft reboot, etc.) in terms of loading IBB module 106 followed by GPD module 108. IBB module 106 may be initiated in operation 300. Following initiation, in operation 302 GPD pointer 112 may be located IBB module 106. A determination may then be made in operation 304 as to whether GPD pointer 112 is valid (e.g. whether GPD pointer 112 points to a valid region within the memory on which IBB module 106 is stored). If it is determined in operation 304 that GPD pointer 112 is invalid, then in operation 306 an error may be reported (e.g., a notification message may be presented, sound may be generated, etc. via user interface module 208 in device 100) informing a user of device 100 of the problem.

If in operation 304 it is determined that GPD pointer 112 is valid, then in operation 308 an attempt may be made to get a token based on GPD pointer 112 so that IBB 200 may access the contents of GPD module 108 (e.g., configuration parameters 112 and/or SCL 116). A determination may then be made in operation 310 as to whether the token obtained based on GPD pointer 112 is valid. A determination in operation 310 that the token is invalid may be followed by operation 306 wherein an error may be reported. If in operation 310 it is determined that the token is valid, then in operation 312 the contents of GPD module 108 may be loaded for use in configuring the silicon initialization being performed by IBB module 106.

Figure 4:
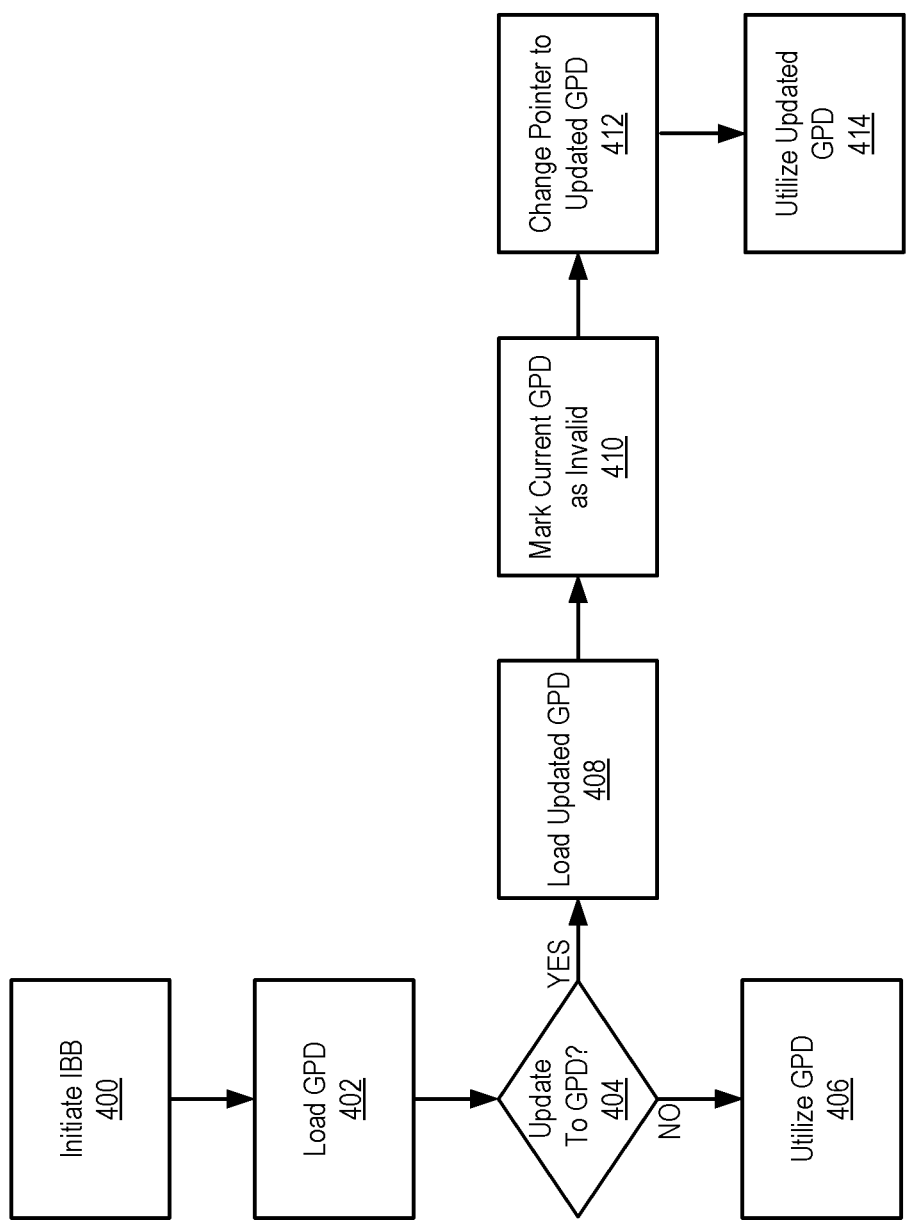
FIG. 4 illustrates example operations for updating a global platform database module in accordance with at least one embodiment of the present disclosure.

FIG. 4 illustrates example operations for updating a global platform database module in accordance with at least one embodiment of the present disclosure. The operations shown in FIG. 4 disclose an example embodiment consistent with the present disclosure wherein a determination may be made as to whether an update to GPD module 108 exists in device 100. IBB module 106 may be initiated in operation 400 followed by the loading of GPD module 108 in operation 402. In one embodiment, operations 400 and 402 may employ operations such as disclosed in FIG. 3 to locate GPD module 108 in boot code 104. A determination may then be made in operation 404 as to whether an update exists for GPD module 108 in device 100. An example update may include data that replaces some or all of configurable parameters 114 and/or SCL 116. Whether an update exists in device 100 may be determined based on, for example, the existence of data identified as an update to GPD module 108 based on filename, file extension and/or memory location in device 100, setting of an indicator or flag (e.g., bit, numerical value, string, etc.) in device 100, manual interaction by a user of device 100, etc.

If it determined in operation 404 that no update to GPD module 108 exists in device 100, then in operation 406 the existing GPD module 108 (e.g., as located using the example operations of FIG. 3) may be utilized in operation 406. If in operation 404 it is determined that an update to GPD module 108 exists in device 100, then in operation 408 the updated GPD module 108 may be loaded into boot module 102 (e.g., and added to boot code 104). Current GPD module 108 (e.g., to which GPD indicator 112 is currently pointing) may then be marked as invalid in operation 410. For example, GPD modules 108 marked as invalid may later be "cleaned up" (e.g., may be deleted to free up memory) as part of a maintenance operation. In operation 412, GPD pointer 112 in IBB module 106 may be changed to indicate the location of updated GPD module 108 in boot code 104. In operation 414, updated GPD module 108 may be utilized by IBB module 106 for configuring silicon initialization in device 100.

Figure 5:
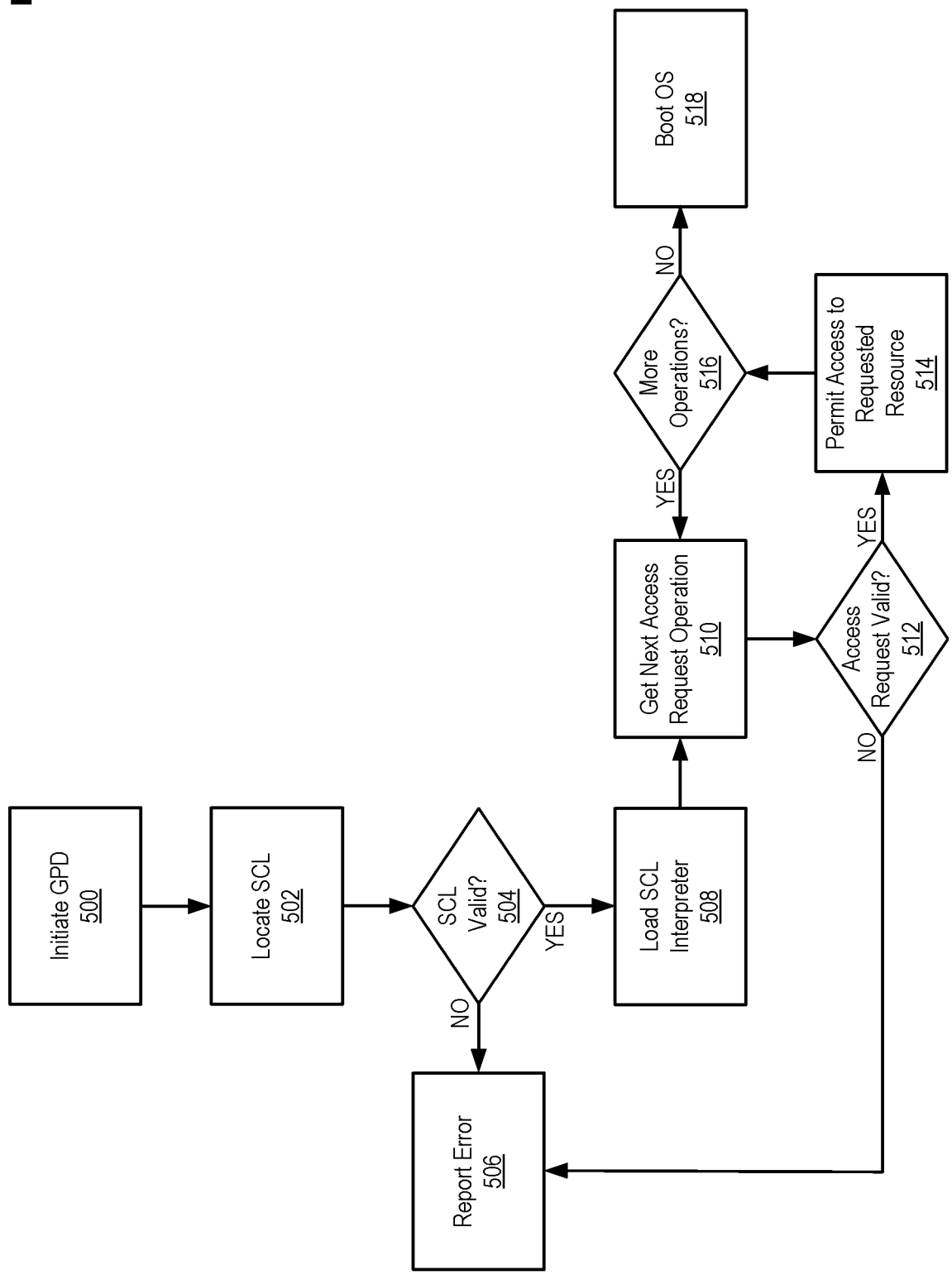
FIG. 5 illustrates example operations for executing simple configuration language in accordance with at least one embodiment of the present disclosure.

FIG. 5 illustrates example operations for executing simple configuration language in accordance with at least one embodiment of the present disclosure. In general, the operations illustrated in FIG. 5 describe how instructions in SCL 116 may be validated and/or executed consistent with an embodiment of the present disclosure. GPD module 108 may be initiated in operation 500. Initiation of GPD module 108 may be followed by locating SCL 116 (e.g., via SCL Offset 118) in operation 502. A determination may then be made in operation 504 as to whether SCL 116 is valid (e.g., whether SCL 116 exists at the location indicated by SCL Offset 118, whether SCL 116 comprises logical operations formulated using correct syntax, etc.). If in operation 504 it is determined that SCL 116 is invalid, then in operation 506 an error may be reported (e.g., a notification message may be presented and/or sound may be generated via user interface module 208) to inform a user of device 100 of the problem.

If in operation 504 it is determined that SCL 116 is valid, then in operation 508 an interpreter may be loaded to execute logical operations set forth in SCL 116. The logical operations in SCL 116 may comprise, for example, at least one access request operation. Access request operations may request access to read, alter, etc. data stored in device 100, access to store new data in device 100, etc. The next unexecuted access request operation may be obtained in operation 510, and in operation 512 a determination may be made as to whether the access request operation is valid. The validity of an access request operation may be based on whether granting access as requested could jeopardize operational stability, security, etc. of device 100. For example, validity may be based on the target of the access request (e.g. equipment in device 100 such as a region in memory module 204, etc.), the type of access being requested (e.g., reading or writing data, loading a driver, utility, application, etc.), etc. A determination in operation 512 that the access request operation is not valid may be followed by an error being reported in operation 506.

Alternatively, if it is determined in operation 512 that the access request operation is valid, then in operation 514 access to the requested resource may be permitted. A determination may then be made in operation 516 as to whether additional operations still need to be executed in SCL 116. A determination in operation 516 that access request operations are still pending for execution may be followed by a return to operation 510 to load the next access request operation into the interpreter. If it is determined in operation 516 that no access request operations are pending for execution in SCL 116, then device 100 may proceed to initiate booting of an OS in operation 518.

Figure 6:
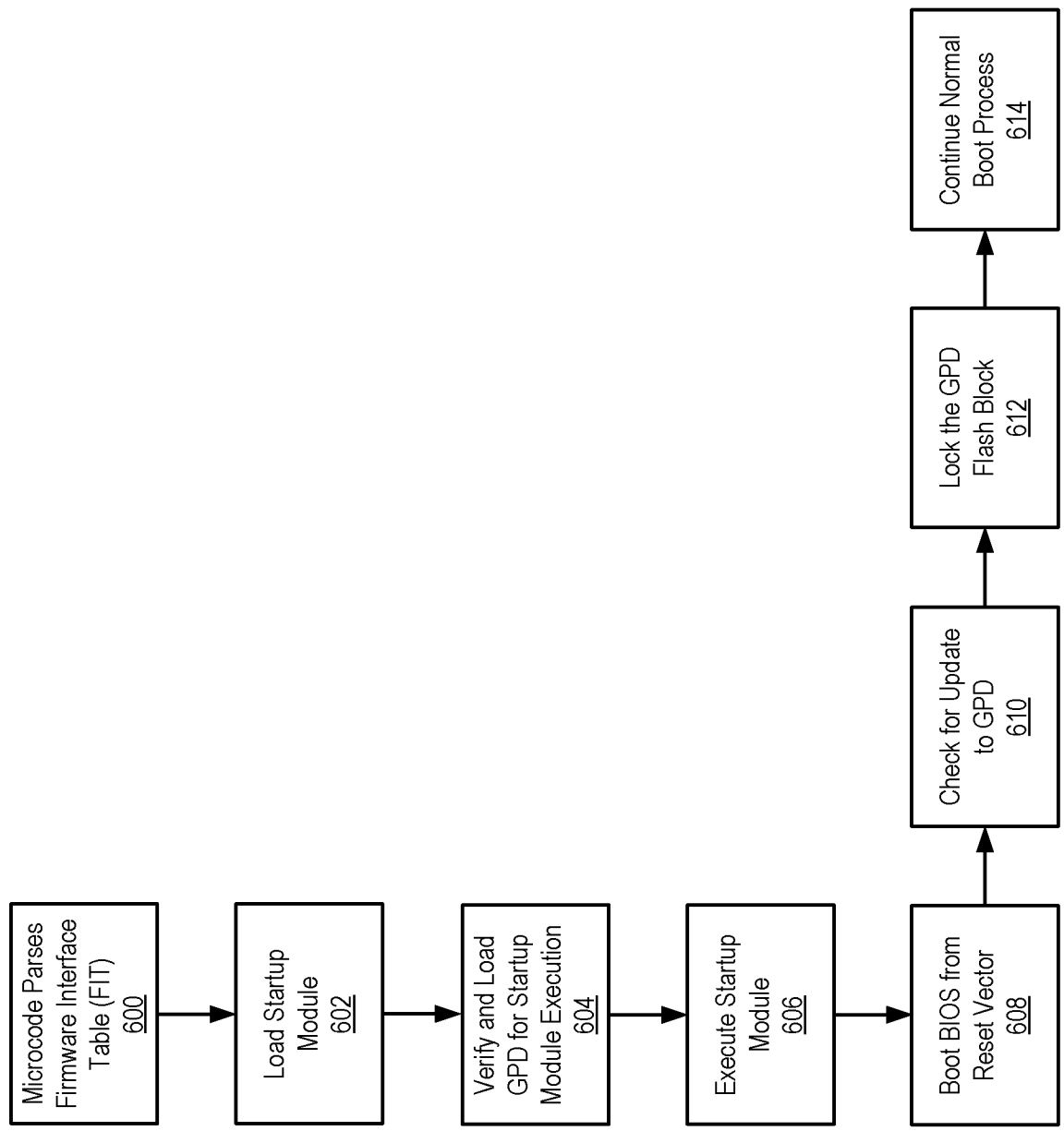
FIG. 6 illustrates example operations for an implementation of silicon initialization accordance with at least one embodiment of the present disclosure.

FIG. 6 illustrates example operations for an implementation of silicon initialization accordance with at least one embodiment of the present disclosure. In general, the example operations disclosed in FIG. 6 apply the concepts described in the previous figures in a more practical context. Initially, microcode in boot module 102 may parse a firmware information table (FIT) in operation 600. In one embodiment, the FIT may include GPD pointer 112. A startup module (e.g., IBB module 106) may then be loaded in operation 602, followed by verification and loading of GPD module 108 for use in the startup module execution in operation 604. In operation 606, the startup module may be executed. BIOS may then be booted from a reset vector in operation 608. A check for updates to GPD module 108 in device 100 may then be performed in operation 610, which may then be followed by locking the flash black including GPD module 108 in operation 612. Normal boot operations may continue in operation 614.

While FIGS. 3 to 6 may illustrate operations according to different embodiments, it is to be understood that not all of the operations depicted in FIGS. 3 to 6 are necessary for other embodiments. Indeed, it is fully contemplated herein that in other embodiments of the present disclosure, the operations depicted in FIGS. 3 to 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to controlled customization of silicon initialization. A device may comprise, for example, a boot module including a memory on which boot code is stored, the boot code including at least an initial boot block (IBB) module that is not customizable and a global platform database (GPD) module including customizable data. The IBB module may include a pointer indicating GPD module location. The customizable data may comprise configurable parameters and simple configuration language (SCL) to cause the device to execute at least one logical operation during execution of the boot code. The GPD module may further comprise a pointer indicating SCL location. The boot code may be executed upon activation of the device, which may cause the IBB module to load an interpreter for executing the SCL. The interpreter may also verify access request operations in the SCL are valid before executing the access request operations.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for controlled customization of silicon initialization, as provided below.

According to example 1 there is provided a device for controlled customization of silicon initialization. The device may comprise at least a boot module including at least a memory on which boot code is stored, the boot code being executed when the device is activated and including at least an initial boot block module that is not accessible for customization and a global platform database module including at least customizable data.

Example 2 includes the elements of example 1, wherein the memory is at least one of nonvolatile memory or field updatable read-only memory.

Example 3 includes the elements of any of examples 1 to 2, wherein the initial boot block comprises a pointer indicating where in the boot code the global platform database module is located.

Example 4 includes the elements of example 3, wherein the pointer is an entry included in a firmware information table in the initial boot block.

Example 5 includes the elements of example 4, wherein microcode parses the firmware information table following activation of the device.

Example 6 includes the elements of example 3, wherein the initial boot block is at least to determine if an update to a current global platform database module exists in the device.

Example 7 includes the elements of example 6, wherein if it is determined by the initial boot block that an update to the current global platform database module exists, the initial boot block is further to load an updated global platform database module into the boot code, mark the current global platform database module as invalid and update the pointer in the initial boot block to indicate where in the boot code the updated global platform database module is located.

Example 8 includes the elements of example 7, wherein the initial boot block is further to perform cleanup operations comprising at least deleting any global platform database module marked as invalid from the boot code.

Example 9 includes the elements of example 3, wherein the initial boot block is at least to determine if an update to a current global platform database module exists in the device, and if it is determined by the initial boot block that an update to the current global platform database module exists, the initial boot block is further to load an updated global platform database module into the boot code, mark the current global platform database module as invalid and update the pointer in the initial boot block to indicate where in the boot code the updated global platform database module is located.

Example 10 includes the elements of example 1, wherein the customizable data comprises at least one configurable parameter.

Example 11 includes the elements of example 1, wherein the customizable data comprises at least simple configuration language to cause the device to execute at least one operation during execution of the boot code.

Example 12 includes the elements of example 11, wherein the global platform database module comprises an offset indicating where in the global platform database module the simple configuration language is located.

Example 13 includes the elements of example 11, wherein the initial boot block is at least to cause an interpreter to be loaded during execution of the boot code, the interpreter being at least to execute the simple configuration language.

Example 14 includes the elements of example 13, wherein the interpreter is further to determine if at least one access request operation included in the simple configuration language is valid prior to executing the at least one access request operation.

According to example 15 there is provided a method for controlled customization of silicon initialization. The method may comprise initiating an initial boot block module included in boot code in a device, the boot block not being accessible for customization, locating a pointer in the initial boot block to a global platform database module also included in the boot code, the global platform database module including at least customizable data, determining if the pointer to the global platform database module is valid and utilizing the global platform database module as part of the boot code based on a determination that the pointer is valid.

Example 14 includes the elements of example 16, and further comprises obtaining a token based on determining that the pointer is valid and determining if the token based on the pointer is valid prior to utilizing the global platform database module.

Example 17 includes the elements of example 16, and further comprises reporting an error based on a determination that the pointer or the token is invalid.

Example 18 includes the elements of example 15, and further comprises determining if an update to a current global platform database module exists in the device.

Example 19 includes the elements of example 18, and further comprises, if it is determined that an update to the current global platform database module exists in the device, loading an updated global platform database module into the boot code, marking the current global platform database module as invalid and updating the pointer in the initial boot block to indicate where in the boot code the updated global platform database module is located.

Example 20 includes the elements of example 19, and further comprises performing cleanup operations comprising at least deleting any global platform database module marked as invalid from the boot code.

Example 21 includes the elements of example 15, wherein the customizable data comprises at least one configurable parameter.

Example 22 includes the elements of example 15, wherein the customizable data comprises at least simple configuration language to cause the device to execute at least one operation during execution of the boot code.

Example 23 includes the elements of example 22, and further comprises locating an offset in the global platform database module indicating where in the global platform database module the simple configuration language is located.

Example 24 includes the elements of any of examples 22 to 23, further comprising loading an interpreter to at least to execute the simple configuration language.

Example 25 includes the elements of example 24, and further comprises determining if at least one access request operation included in the simple configuration language is valid and executing the at least one access request operation based on a determination that the at least one access request operation is valid.

Example 26 includes the elements of example 15, and further comprises determining if an update to a current global platform database module exists in the device, and if it is determined that an update to the current global platform database module exists in the device, loading an updated global platform database module into the boot code, marking the current global platform database module as invalid and updating the pointer in the initial boot block to indicate where in the boot code the updated global platform database module is located.

Example 27 includes the elements of example 15, wherein the customizable data comprises at least one of at least one configurable parameter and simple configuration language to cause the device to execute at least one operation during execution of the boot code.

Example 28 includes the elements of example 27, and further comprises locating an offset in the global platform database module indicating where in the global platform database module the simple configuration language is located and loading an interpreter to at least to execute the simple configuration language.

According to example 29 there is provided a system including a device, the system being arranged to perform the method of any of the above examples 15 to 28.

According to example 30 there is provided a chipset arranged to perform the method of any of the above examples 15 to 28.

According to example 31 there is provided at least one machine readable medium comprising a plurality of instructions that, in response to be being executed on a computing device, cause the computing device to carry out the method according to any of the above examples 15 to 28.

According to example 32 there is provided a device configured for controlled customization of silicon initialization, the device being arranged to perform the method of any of the above examples 15 to 28.

According to example 33 there is provided a system for controlled customization of silicon initialization. The system may comprise means for initiating an initial boot block module included in boot code in a device, the boot block not being accessible for customization, means for locating a pointer in the initial boot block to a global platform database module also included in the boot code, the global platform database module including at least customizable data, means for determining if the pointer to the global platform database module is valid and means for utilizing the global platform database module as part of the boot code based on a determination that the pointer is valid.

Example 34 includes the elements of example 33, and further comprises means for obtaining a token based on determining that the pointer is valid, means for determining if the token based on the pointer is valid prior to utilizing the global platform database module and means for reporting an error based on a determination that the pointer or the token is invalid.

Example 35 includes the elements of any of examples 33 to 34, and further comprises means for determining if an update to a current global platform database module exists in the device and means for, if it is determined that an update to the current global platform database module exists in the device, loading an updated global platform database module into the boot code, marking the current global platform database module as invalid and updating the pointer in the initial boot block to indicate where in the boot code the updated global platform database module is located.

Example 36 includes the elements of example 35, and further comprises means for performing cleanup operations comprising at least deleting any global platform database module marked as invalid from the boot code.

Example 37 includes the elements of example 33, wherein the customizable data comprises at least one of at least one configurable parameter.

Example 38 includes the elements of example 33, wherein the customizable data comprises at least simple configuration language to cause the device to execute at least one operation during execution of the boot code.

Example 39 includes the elements of example 38, and further comprises means for locating an offset in the global platform database module indicating where in the global platform database module the simple configuration language is located.

Example 40 includes the elements of any of examples 38 to 39, and further comprises means for loading an interpreter to at least to execute the simple configuration language.

Example 41 includes the elements of example 40, and further comprises means for determining if at least one access request operation included in the simple configuration language is valid and means for executing the at least one access request operation based on a determination that the at least one access request operation is valid.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A boot code device, comprising:
   initial boot block (IBB) circuitry to store non-customizable initialization data for at least one functional circuit in communication with the IBB circuitry; and
   global platform database (GPD) circuitry to store at least one customizable parameter associated with the at least one functional circuit in communication with the IBB circuitry;
   wherein, the IBB circuitry is also to generate a pointer that points to a location where the at least one customizable parameter is stored in the GPD circuitry; and the IBB circuitry is further to determine if the at least one customizable parameter has been updated, to modify the pointer to point to the updated customizable parameter of the GPD circuitry, and to utilize the updated customizable parameter of the GPD circuitry.

2. The boot code device of claim 1, wherein the at least one customizable parameter includes at least one of bit settings, integers, or data strings that describe configuration characteristics for a plurality of functional circuits.

3. The boot code device of claim 1, wherein the GPD circuitry is also to generate a command to cause the at least one functional circuit to execute an operation upon initialization of the at least one functional circuit.

4. The boot code device of claim 3, wherein the IBB circuitry is also to, in response to the GPD circuitry generating the command to cause the at least one functional circuit to execute an operation, validate the command.

5. The boot code device of claim 3, wherein the command is to be generated using a simple configuration language (SCL) protocol.

6. The boot code device of claim 1, wherein the IBB circuitry and the GPD circuitry comprise non-volatile memory.

7. The boot code device of claim 1, wherein the boot code device comprises a memory comprising the non-customizable initialization data stored by the IBB circuitry and the at least one customizable parameter stored by the GPD circuitry, wherein the pointer and the modified pointer point to different locations within the memory.

8. The boot code device of claim 1, wherein the boot code device is to mark a GPD module as invalid in association with modifying the pointer.

9. The boot code device of claim 1, wherein the GPD circuitry is further to store an offset indicating the start of at least one command to cause the at least one functional circuit to execute a plurality of operations upon initialization of the at least one functional circuit.

10. A system, comprising:
    at least one functional circuit; and
    a boot code device, comprising:
    initial boot block (IBB) circuitry to store non-customizable initialization data for the at least one functional circuit in communication with the IBB circuitry; and global platform database (GPD) circuitry to store at least one customizable parameter associated with the at least one functional circuit in communication with the IBB circuitry;

wherein, the IBB circuitry is also to generate a pointer that points to a location where the at least one customizable parameter is stored in the GPD circuitry; and the IBB circuitry is further to determine if the customizable parameter has been updated, to modify the pointer to point to the updated customizable parameter of the GPD circuitry, and to utilize the updated customizable parameter of the GPD circuitry.

11. The boot code device of claim 10, wherein the at least one customizable parameter includes at least one of bit settings, integers, or data strings.

12. The boot code device of claim 10, wherein the GPD circuitry is also to generate a command to cause the at least one functional circuit to execute an operation upon initialization of the at least one functional circuit.

13. The boot code device of claim 12, wherein the IBB circuitry is also to, in response to the GPD circuitry generating the command to cause the at least one functional circuit to execute an operation, validate the command.

14. The boot code device of claim 12, wherein the command is to be generated using a simple configuration language (SCL) protocol.

15. The boot code device of claim 10, wherein the IBB circuitry and the GPD circuitry comprise non-volatile memory.

16. At least one computer-readable boot code device having stored thereon instructions that, when executed by at least one processor, cause the at least one processor to perform operations comprising:

initialize initial boot block (IBB) circuitry, wherein the IBB circuitry is not accessible for customization;

generate a pointer that points to global platform database (GPD) circuitry, the GPD circuitry comprising at least one customizable parameter; and determine if the at least one customizable parameter has been updated, modify the pointer to point to the updated customizable parameter of the GPD circuitry, and utilize the updated customizable parameter of the GPD circuitry.

17. The at least one computer-readable boot code device of claim 16, wherein the at least one customizable parameter includes at least one of bit settings, integers, or data strings.

18. The at least one computer-readable boot code device of claim 16, wherein the instructions, when executed by at least one processor, cause the at least one processor to perform further operations comprising:

generate a command to cause at least one functional circuit, in communication with the IBB circuitry, to execute an operation upon initialization of the at least one functional circuit.

19. The at least one computer-readable boot code device of claim 18, wherein the instructions, when executed by at least one processor, cause the at least one processor to perform further operations comprising:

validate the command.

20. The at least one computer-readable boot code device of claim 18, wherein the command is to be generated using a simple configuration language (SCL) protocol.

21. The at least one computer-readable boot code device of claim 16, wherein the IBB circuitry and the GPD circuitry comprise non-volatile memory.

* * * * *